United States Patent Office 3,242,642
Patented Mar. 29, 1966

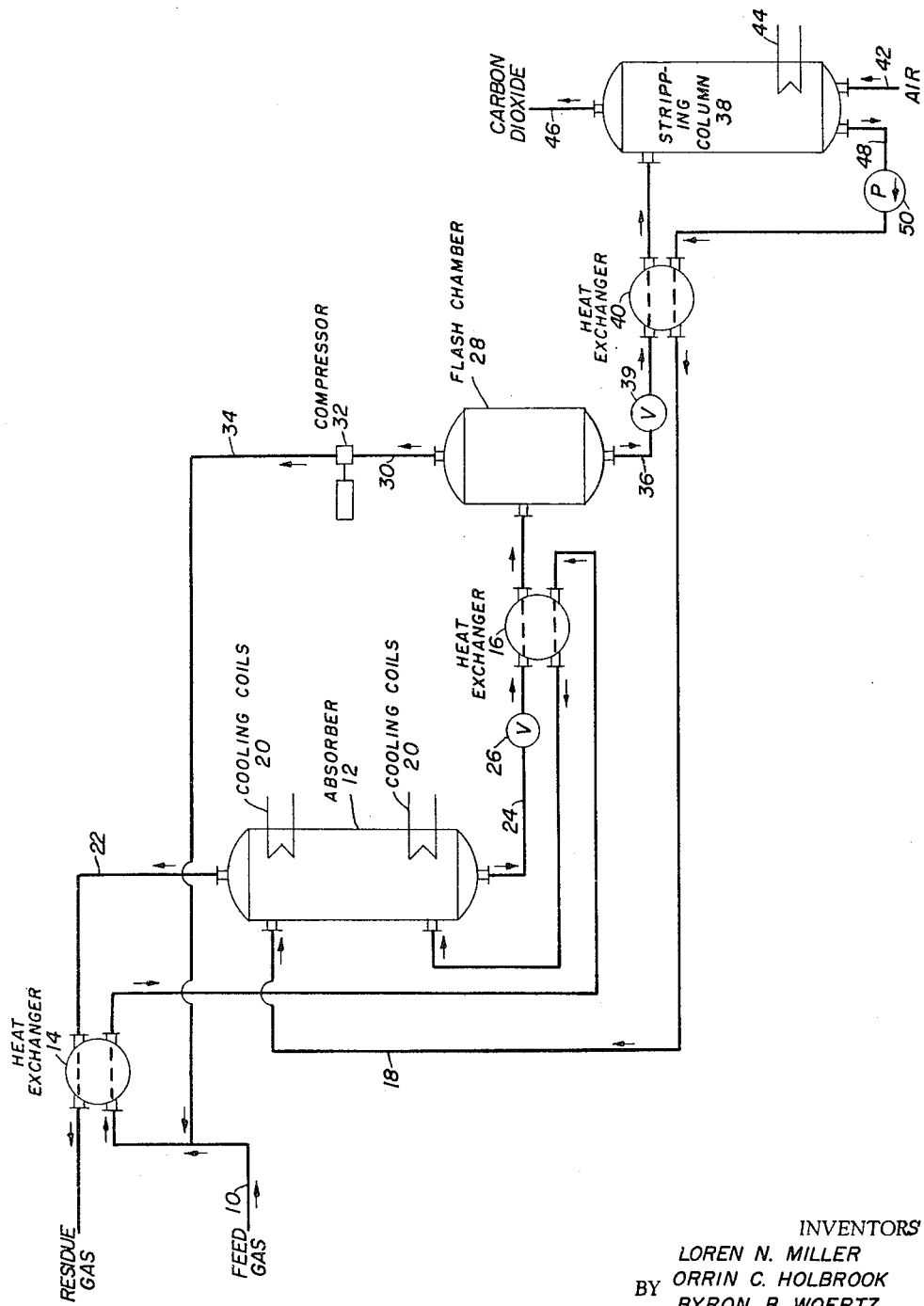

3,242,642
PROCESS FOR REMOVING ACID CONSTITUENTS FROM GASEOUS MIXTURES
Loren N. Miller, Arvada, Colo., Orrin C. Holbrook, Andrews, Tex., and Byron B. Woertz, Crystal Lake, Ill., assignors, by mesne assignments, to Union Oil Company of California, Los Angeles, Calif., a corporation of California
Filed Dec. 11, 1962, Ser. No. 243,814
12 Claims. (Cl. 55—44)

This invention relates to a selective solvent for removing acid gases from admixtures with non-acidic constituents and, more particularly, to an improved process for the removal of carbon dioxide from a gaseous mixture of hydrocarbons and/or other non-acidic constituents containing carbon dioxide by the use of a selective solvent consisting essentially of formamide. This invention is especially useful for removing carbon dioxide from natural gases containing significant amounts of ethane and heavier hydrocarbons.

The acid gas content of natural gases varies between broad limits, depending on the field from which it was produced. Natural gases produced from some subterranean reservoirs contain undesirably high concentrations of acid gases, such as carbon dioxide and hydrogen sulfide. Before these gases can be sold, it is necessary that the high concentration of acid gases be removed or at least reduced to an acceptable concentration. Various methods of removing acid gases from natural gas have been proposed. The removal of hydrogen sulfide has been accomplished by several acceptable commercial methods, but the removal of carbon dioxide remains a problem in the art.

Since carbon dioxide is chemically reactive while the hydrocarbon gases are relatively inert, one approach taken in attempting to solve the problem of removing carbon dioxide from mixtures containing the same is the use of solvents which react with carbon dioxide to remove it in chemically combined form. For example, hot potassium carbonate and mono-or diethanolamine have been proposed for removing carbon dioxide from natural gas. However, in order for any separation process to be practical, it must be possible to regenerate and recycle the solvent. It is apparent that regeneration of the chemically reactive solvents is expensive, and processes based on them are especially expensive when high concentrations of $CO_2$ are involved.

It has also been proposed to remove carbon dioxide from gaseous mixtures by the utilization of solvents which have a selective solubility for carbon dioxide. Selective solvents currently used commercially in carbon dioxide removal processes are water, methyl alcohol, acetone, and propylene carbonate. The selectivity of water for carbon dioxide is excellent, but its capacity is very low, thereby requiring high circulation rates and large tower sizes in the water-wash process. At ambient temperature, the capacity of methyl alcohol is high but its selectivity is very poor. Propylene carbonate extraction is the most economical method of removing large concentrations of carbon dioxide from methane since its capacity for carbon dioxide is high and its selectivity for extracting carbon dioxide from methane is excellent. However, its selectivity decreases rapidly as the molecular weights of the hydrocarbons in the gaseous mixture increase. In removing carbon dioxide from rich gases, the propylene carbonate process would result in prohibitive loss of ethane and heavier hydrocarbons. Inasmuch as the propylene carbonate process is suitable for use in only very "lean" gas, i.e., gas having a low content of ethane and higher-molecular-weight hydrocarbons, its usefulness is restricted to the removal of carbon dioxide from natural gases produced from only a small percentage of existing fields.

In accordance with this invention, we have found that formamide has a relatively high selectivity for carbon dioxide when the carbon dioxide is in admixture with non-acidic gases, such as hydrocarbons. Although the capacity of formamide for carbon dioxide is less than many carbon dioxide solvents, it may be used in admixture with such high carbon dioxide-capacity solvents to improve the selectivity thereof. For example, a solvent mixture comprising formamide and propylene carbonate is superior to pure propylene carbonate with respect to selectivity in removing carbon dioxide from gaseous mixtures containing significant amounts of ethane and heavier hydrocarbons.

It is, therefore, a primary object of this invention to provide a process for removing acid gases from gaseous mixtures containing same. Another object of this invention is to provide a process for removing carbon dioxide from a hydrocarbon gas mixture containing same. Still another object of this invention is to provide a process for removing carbon dioxide from natural gas containing significant amounts of ethane and higher-molecular-weight hydrocarbons. A further object of this invention is to provide a process for the removal of carbon dioxide from gaseous mixtures utilizing a selective solvent consisting of formamide in admixture with a selective solvent which has a higher capacity but lower selectivity for carbon dioxide than formamide. A still further object of this invention is to provide a process for enhancing the ability of propylene carbonate to reject ethane and heavier hydrocarbon gases when utilized for removing carbon dioxide from hydrocarbon-containing gaseous mixtures. These and further objects of this invention will become apparent or be described as the description herein proceeds and reference is made to the accompanying drawing which is a diagrammatic illustration of an absorption-desorption system for carrying out the process of this invention.

Although formamide has too low of a capacity for carbon dioxide to be an effective carbon dioxide solvent when used in the pure form, its high selectivity for carbon dioxide in admixture with non-acidic gases makes formamide a useful compounding agent for various carbon dioxide solvents. Formamide can be used in admixture with carbon dioxide solvents to modify a property of such solvents, such as to reduce viscosity, reduce the partial pressure of vapor, or increase selectivity for carbon dioxide. For example, in many instances it will be desirable to sacrifice some of the capacity a solvent, such as propylene carbonate, has for carbon dioxide in order to improve its selectivity for carbon dioxide in the presence of ethane and heavier hydrocarbons. In such a case, formamide is added to the solvent in an amount sufficient to increase its carbon dioxide selectivity a desired amount. The solvent circulation rate may be increased in order to compensate for the reduction in capacity resulting from the addition of formamide.

In general, formamide may be used in an amount of up to about 50% by volume of the solvent composition comprising formamide and at least one carbon dioxide solvent. It will be evident that the carbon dioxide solvents with which formamide is used in admixture are miscible with formamide and chemically inert with respect to formamide. In addition to propylene carbonate, formamide may be utilized in admixture with other carbon dioxide absorbents, such as $\gamma$-butyrolactone, dimethylformamide and those disclosed in our following copending U.S. patent applications:

| Application Serial Number | Application Filing Date | Disclosed Absorbent |
| --- | --- | --- |
| 243,769 | December 11, 1962 | Nitromethane. |
| 247,719 | December 27, 1962 | Hydracrylonitrile. | and mixtures thereof.

The process hereinafter described will also be generally effective for removing hydrogen sulfide from gaseous mixtures.

In general, this invention contemplates the removal of carbon dioxide from gaseous mixtures containing same by treatment with the formamide-containing solvent. In addition to the treatment of natural gas containing carbon dioxide, the process of this invention is applicable to the treatment of any carbon dioxide-containing gaseous mixture as long as the solvent has a selectivity for extracting carbon dioxide from the gaseous mixture. For example, the solvent of this invention can be used for removing carbon dioxide from flue gas, ammonia synthesis gas, or hydrogen.

The process of this invention is carried out using conventional absorption procedures, wherein the gaseous mixture is contacted with the selective solvent of this invention in either batchwise or continuous treatment. Successive batchwise extractions also can be used. In the preferred method of practicing the invention, the gaseous mixture to be treated is contacted in a countercurrent absorption tower with the formamide-containing absorbent in a continuous flow method. The spent solvent is continuously withdrawn from the absorption tower and is introduced into a flash chamber and/or air-stripping column to remove the absorbed gases. The regenerated solvent is then recycled through the absorption tower where it is used again.

It will be evident that the absorption conditions, viz., absorption temperature and pressure, rate at which the feed gas is contacted with the solvent, etc., depend upon such variable factors as the solvent with which formamide is utilized in admixture, amount of formamide in the solvent mixture, amount of carbon dioxide in the feed gas, etc. The minimum temperature at which any specific solvent mixture can be used at a given pressure is the minimum temperature at which the mixture is a liquid, or the hydrate temperature of the gas being treated, whichever is higher. The vaporization loss of the absorbent mixture is a factor in determining the maximum contact temperature at a given pressure. In general, pressures from about 100 to 1000 p.s.i.g., temperatures from about $-50°$ to $100°$ F., and contacting rates from about 5 to 100 gallons of solvent per Mc.f. of gas may be used. However, depending on the purity of the solvent components, it frequently is necessary to maintain the absorption temperature greater than about $25°$ F. to avoid freezing of the solvent. This limitation can be reduced by the use of eutectic mixtures of solvents.

This invention is best understood by reference to the accompanying drawing, wherein a feed gaseous mixture containing carbon dioxide which is to be removed therefrom, such as natural gas, is fed through line 10 into the bottom of absorber 12 after it passes in indirect heat exchange with the residue gas from absorber 12 in heat exchanger 14 and rich absorbent in heat exchanger 16. The absorbent, comprising equal volumes of formamide and propylene carbonate, is introduced into the top of absorber 12 through line 18. Absorber 12 can be any suitable absorption column, such as a vertically extended column, containing appropriate packing or trays to assure intimate countercurrent contact of the rising feed mixture with the down-flowing absorbent, and cooling coils 20 to provide the desired degree of cooling, as illustrated in the drawing. Absorber 12 is maintained under such conditions of pressure, usually superatmospheric, and temperature that carbon dioxide is absorbed from the feed mixture. As previously indicated, the absorption process is preferably carried out at a temperature within the range of about $-50°$ to $100°$ F. and a pressure between about 100 and 1000 p.s.i.g. The amount and rate of carbon dioxide absorption increase directly with an increase in the pressure maintained in the absorption zone. The feed mixture, from which at least part of the carbon dioxide content has been absorbed, is then removed from absorber 12 through line 22, passed in indirect heat exchange with the feed gas in exchanger 14, and fed to a suitable receiver or otherwise disposed of.

The spent absorbent, containing absorbed carbon dioxide, is withdrawn from absorber 12 through line 24. Then, the rich absorbent undergoes a controlled pressure reduction, such as by passing it successively through expansion valve 26, heat exchanger 16 and flash chamber 28. Flash chamber 28 is maintained at a pressure below the pressure of absorption column 12, but above atmospheric pressure, e.g., about 50 to 200 p.s.i.g. As the absorbent undergoes a pressure reduction, it is cooled due to the loss of heat of absorption acquired in absorber 12 and expansion of absorbed carbon dioxide to a lower partial pressure. Part of the absorbed carbon dioxide and non-acidic constituents of the feed gas are withdrawn from flash chamber 28 through line 30. The gases in line 30 are compressed in compressor 32, and passed through line 34 to be mixed with the feed gas before it passes through exchanger 14. The partially desorbed absorbent is withdrawn from flash chamber 28 through line 36 and fed into stripping column 38 after it has passed successively through expansion valve 39 and exchanger 40 in indirect heat exchange with the lean absorbent withdrawn from column 38.

Air or other inert stripping gas is introduced into stripping column 38 through line 42. Stripping column 38 is provided with heating coil 44 to apply heat if necessary. In stripping column 38, substantially all of the remaining absorbed carbon dioxide is removed and withdrawn through line 46 to be disposed of as desired. Line 46 may be provided with a vacuum pump, if desired. The resulting lean absorbent is then withdrawn from stripping column 38 through line 48, where it is forced by pump 50 through heat exchanger 40 and then returned to absorber 12 through line 18. If desired, a cooler may be provided in line 18.

Other alternative absorption-desorption processes will be apparent to those skilled in the art. For example, if it is not desired to limit the loss of the non-acidic constituents of the feed gas, the rich absorbent may be desorbed in a flash or stripping step and the off-gases disposed of as desired. The partially desorbed absorbent may then be recycled to the absorber or introduced into a stripping column to remove the last vestiges of absorbed carbon dioxide before it is recycled to the absorption column. The residue gas from the absorber and/or the flash gas may be passed through a solid bed of an absorbent, such as silica gel, activated alumina, activated carbon or a synthetic zeolite, to separate vaporized absorbent therefrom.

The following specific example will serve to more particularly point out the instant invention:

*Example I*

Tables I and II are illustrative of the process streams of the process depicted in the accompanying drawing wherein a natural gas mixture is contacted in absorber 12, maintained at 600 p.s.i.a. and $0°$ F., with the lean absorbent. One hundred pound mols of the natural gas per unit time are contacted in different runs with (1) 50 volume percent of formamide and 50 volume percent of propylene carbonate and (2) propylene carbonate in such amounts that the residue gas contains 2 volume percent of carbon dioxide. The rich absorbent withdrawn from absorber 12 is flashed at 150 p.s.i.a. and 0° F. in flash chamber 28 and the pressure of the partially desorbed absorbent withdrawn from flash chamber 28 is reduced to atmospheric pressure in stripping column 38. Table I gives the compositions of the process streams where the gas is contacted with the blend and, for the purpose of comparison, Table II gives the composition of the process streams wherein the gas is contacted with the propylene carbonate.

The required solvent circulation is 53.9 gallons of the formamide-propylene carbonate blend per M c.f. of inlet gas as compared to 21.7 gal./M c.f. when using propylene carbonate (gas and solvent volumes measured at 14.7 p.s.i.a. and 60° F.). However, as shown in the following table, the recycle gas (line 30) is reduced 35% and the residue gas yield (line 22) is increased 2.5% by the use of our solvent blend.

*Table I*

$CO_2$ ABSORPTION PROCESS USING 50 VOLUME PERCENT OF FORMAMIDE AND 50 VOLUME PERCENT OF PROPYLENE CARBONATE

| Components | Mols of Inlet Gas (Line 10) | Mols of Solvent (Line 18) | Residue Gas (Line 22) | | Mols of Rich Solvent (Line 24) | 150 p.s.i.a. Flash Gas (Line 30) | | Atmos. Strip Gas (Line 46) | |
|---|---|---|---|---|---|---|---|---|---|
| | | | Mols | Mol Percent | | Mols | Mol Percent | Mols | Mol Percent |
| Methane | 72.00 | | 71.88 | 88.70 | 2.58 | 2.46 | 57.61 | 0.12 | .63 |
| Ethane | 6.00 | | 5.68 | 7.01 | 0.86 | 0.54 | 12.65 | 0.32 | 1.69 |
| Propane | 2.00 | | 1.50 | 1.85 | 0.67 | 0.17 | 3.98 | 0.50 | 2.64 |
| $CO_2$ | 19.00 | | 1.62 | 2.00 | 18.43 | 1.05 | 24.59 | 17.38 | 91.67 |
| n-Butane | 1.00 | | 0.36 | 0.44 | 0.69 | 0.05 | 1.17 | 0.64 | 3.37 |
| Absorbent | 0 | 314.49 | 0 | 0 | 314.49 | 0 | 0 | 0 | 0 |
| Total | 100.00 | 314.49 | 81.04 | 100.00 | 337.72 | 4.27 | 100.00 | 18.96 | 100.00 |

*Table II*

$CO_2$ ABSORPTION PROCESS USING PROPYLENE CARBONATE

| Components | Mols of Inlet Gas (Line 10) | Mols of Solvent (Line 18) | Residue Gas (Line 22) | | Mols of Rich Solvent (Line 24) | 150 p.s.i.a. Flash Gas (Line 30) | | Atmos. Strip Gas (Line 46) | |
|---|---|---|---|---|---|---|---|---|---|
| | | | Mols | Mol Percent | | Mols | Mol Percent | Mols | Mol Percent |
| Methane | 72.0 | | 71.56 | 89.34 | 2.53 | 2.09 | 41.8 | 0.44 | 2.21 |
| Ethane | 6.0 | | 5.46 | 6.81 | 0.99 | 0.45 | 9.0 | 0.54 | 2.70 |
| Propane | 2.0 | | 1.33 | 1.66 | 0.87 | 0.20 | 4.0 | 0.67 | 3.37 |
| $CO_2$ | 19.0 | | 1.60 | 2.00 | 19.56 | 2.16 | 43.2 | 17.40 | 87.44 |
| n-Butane | 1.0 | | 0.15 | 0.19 | 0.95 | 0.10 | 2.0 | 0.85 | 4.27 |
| Propyl carbon | 0 | 98.43 | 0 | 0 | 98.43 | 0 | 0 | 0 | 0 |
| Total | 100.0 | 98.43 | 80.10 | 100.00 | 123.33 | 5.00 | 100.0 | 19.90 | 100.00 |

The embodiments of this invention in which an exclusive property or privilege is claimed are defined as follows:

1. The process of removing gaseous acid gas of the group consisting of carbon dioxide and hydrogen sulfide from admixture with gaseous $C_1$–$C_3$ alkane hydrocarbons which comprises contacting said gaseous admixture with a liquid solvent comprising formamide and at least one formamide-miscible liquid absorptive of acid gas, under conditions resulting in selective absorption of acid gas, and separating the unadsorbed components of said gaseous admixture from said solvent.

2. The process according to claim 1 in which said liquid is selected from the group consisting of propylene carbonate, nitromethane, hydracrylonitrile, γ-butyrolactone, dimethylformamide, and mixtures thereof.

3. The process according to claim 1 in which said acid gas is carbon dioxide.

4. The process according to claim 3 in which said solvent contains up to about 50% by volume of formamide.

5. The process according to claim 3 in which said gaseous admixture is passed through an absorption zone at superatmospheric pressure in countercurrent contact with said solvent, a stream of rich solvent is removed from said absorption zone and the pressure thereof is reduced to flash off carbon dioxide and at least part of the residual carbon dioxide from said solvent stream following said pressure reduction is removed by air stripping of said solvent stream.

6. The process according to claim 5 which includes recycling the desorbed solvent to said absorption zone and said contacting is carried out at a temperature from about −50° to 100° F. and a pressure from about 100 to 1000 p.s.i.g.

7. In a process for removing carbon dioxide from a gaseous mixture containing carbon dioxide in admixture with non-acidic constituent by contacting said gaseous mixture with propylene carbonate solvent whereby carbon dioxide is selectively absorbed, the improvement which comprises adding formamide to said propylene carbonate solvent in an amount sufficient to increase the selectivity of said propylene carbonate solvent for carbon dioxide.

8. The process according to claim 7 in which formamide is added to said propylene carbonate solvent in an amount up to the volume of said propylene carbonate solvent.

9. The process according to claim 8 in which said gaseous mixture contains hydrocarbon gases of higher molecular weight than methane.

10. The process of removing carbon dioxide from admixture with gaseous $C_1$–$C_3$ alkane hydrocarbons which comprises contacting said gaseous admixture with a liquid solvent comprising propylene carbonate and up to about 50% by volume of formamide, under conditions resulting in selective absorption of carbon dioxide, and separating the unadsorbed components of said gaseous admixture from said solvent.

11. The process according to claim 10 in which said gaseous admixture contains hydrocarbon gases of higher molecular weight than methane.

12. The process of removing carbon dioxide from admixture with gaseous $C_1$–$C_3$ alkane hydrocarbons which comprises contacting said gaseous admixture with a liquid solvent comprising hydracrylonitrile and up to about 50% by volume of formamide, under conditions resulting in selective absorption of carbon dioxide, and separating the unadsorbed components of said gaseous admixture from said solvent.

References Cited by the Examiner

UNITED STATES PATENTS

| | | | |
|---|---|---|---|
| 2,139,375 | 12/1938 | Millar et al. | 55—73 |
| 2,723,184 | 11/1955 | Creighton | 55—68 X |
| 2,781,863 | 2/1957 | Bloch et al. | 55—73 X |
| 2,863,527 | 12/1958 | Herbert et al. | |
| 2,926,751 | 3/1960 | Kohl et al. | 55—68 X |
| 3,097,917 | 7/1963 | Dotts et al. | 55—73 |

FOREIGN PATENTS

| | | |
|---|---|---|
| 596,692 | 4/1960 | Canada. |
| 596,693 | 4/1960 | Canada. |
| 728,444 | 4/1955 | Great Britain. |
| 750,399 | 6/1956 | Great Britain. |

REUBEN FRIEDMAN, *Primary Examiner.*

D. TALBERT, *Assistant Examiner.*